Patented Mar. 9, 1926.

1,576,454

UNITED STATES PATENT OFFICE.

JEAN PAISSEAU, OF COURBEVOIE, FRANCE.

REFINING PROCESS FOR PEARL ESSENCE.

No Drawing.   Application filed December 22, 1923.   Serial No. 682,330.

*To all whom it may concern:*

Be it known that I, JEAN PAISSEAU, a citizen of the Republic of France, and residing at Courbevoie, Seine Department, No. 5 Rue Blondel, in the Republic of France, manufacturer, have invented certain new and useful Improvements in Refining Processes for Pearl Essence, of which the following is a specification.

The present invention is a continuation in part of my application No. 491,310 filed on the 10th of August 1921, which referred to a general process for the practical preparation of pearl essence, based on the fact that the impurities contained in this substance consist of organic matter and chiefly of the protoplasm of the cells containing the microscopic crystalloids which form the essential part of the pearl essence.

For this reason, all substances capable of disaggregating or dissolving the said protoplasm substances may be employed with satisfactory results. The above cited application has been limited to the use of detergents for carrying out this disaggregation or dissolution of the protoplasm substances which are detrimental to the brilliancy of the crystalloids.

The present invention chiefly relates to the use of ferments instead of detergents, and I may particularly employ the proteolytic ferments, and also the lipolytic ferments when fatty matter is to be eliminated, and the maximum refining action can be obtained by the use of these substances. In this process as in the one claimed in the said application No. 491,310, the agents used for purifying the raw pearl essence or the substances constituting this essence have for effect to disassociate the protoplasm gangue which covers the crystalloids and to uncover the latter so as to give them the most brilliant possible appearance.

The term proteolytic ferments, may be supposed to include all animal, vegetable, microbial or like diastases such as pancreatin, pepsin, papain and others which will render soluble, when operating in a suitable reaction environment, the elbuminoid substances which constitute living matter; and obviously to further include all bodies containing or capable of producing such diastases.

The said ferment treatment can be used directly with fish or like scales, bladders, teguments, etc. . . . containing brilliant crystalloids. It will however be advantageous to apply the treatment to a product which has been already operated upon and is partially purified, and in which the amount of impurities to be removed has been already diminished.

For this reason I preferably carry out the treatment in two stages, i. e. the crude pearl essence is first prepared, and the said essence is subsequently refined.

For the preparation of the crude essence I may, as in known methods, churn or mix up the fish scales in pure water or in alkaline water which is acidified or treated with antiseptics, and this will afford a crude emulsion from which the structural parts of the scales and the bulk of the impurities are then removed by the usual methods of settling or screen filtering. Or otherwise, should a simple stirring not prove sufficient, the substances can be treated by a detergent.

Such a process may be obtained by the use of neutral soap (medicinal soap), and distilled water.

The crude essence thus obtained is concentrated into the pasty state—either by settling for example for 24 hours or by the centrifugal method—before being subjected to the action of ferments. Should pancreatin be employed, the operation is to be performed in an alkaline environment.

I may use for example:

Sediment, 1 liter; solution of pancreatin, 7.5%, 3 liters; ammonium carbonate 4 grams to 10 grams.

The crude essence is mixed up with the alkaline solution, then adding the pancreatin, and the whole is heated on the water bath and maintained for two or three hours at 40 to 45 degrees centigrade.

At the end of this time the organic matter will have been dissolved, and the pearl essence now has a very fine lustre; in order to obtain the crystalloids in the pure state it suffices to remove them from the liquid by settling or by centrifugal action, and to wash them once or twice in alkaline water.

Like results can be had by the use of any other suitable ferment, it being simply necessary to modify the reaction of the environment and the temperature in accordance with the particular nature of the ferment employed; for example with pepsin, the operation is to be carried out in an environment having an acid reaction and not as in other cases in an alkaline environment.

Claims:—

1. A process of preparation of pearl essence wherein the raw material containing the brilliant crystalloids is treated by means of a biological reagent, the latter being of such nature as to produce a fermentation of the organic substances containing the said crystalloids, said treatment being continued until the said organic substances are destroyed, after which the crystalloids are separated from the dissolved residues of the fermentation process.

2. A process of preparation of pearl essence consisting in the use of crude pearl essence as the raw material, in diluting the said essence in water containing a proteolytic ferment and a chemical substance adapted to further the action of said ferment, in allowing the mixture to ferment until the organic matter other than the crystalloids is destroyed, and lastly in separating said crystalloids from the dissolved residues of the fermentation process.

In testimony that I claim the foregoing as my invention, I have signed my name.

JEAN PAISSEAU.